United States Patent
Ando et al.

(10) Patent No.: US 7,718,749 B2
(45) Date of Patent: May 18, 2010

(54) CURABLE COMPOSITION

(75) Inventors: Katsuhiro Ando, Akashi (JP); Shintaro Komitsu, Takasago (JP)

(73) Assignee: Kaneka Corporation, Osaka-shi (JP)

( * ) Notice: Subject to any disclaimer, the term of this patent is extended or adjusted under 35 U.S.C. 154(b) by 618 days.

(21) Appl. No.: 10/581,561

(22) PCT Filed: Dec. 9, 2004

(86) PCT No.: PCT/JP2004/018350

§ 371 (c)(1), (2), (4) Date: Jun. 2, 2006

(87) PCT Pub. No.: WO2005/059000

PCT Pub. Date: Jun. 30, 2005

(65) Prior Publication Data

US 2007/0112145 A1     May 17, 2007

(30) Foreign Application Priority Data

Dec. 18, 2003 (JP) ............................. 2003-421662

(51) Int. Cl.
- C08G 77/00 (2006.01)
- C08L 63/00 (2006.01)
- C08L 83/00 (2006.01)
- B32B 27/38 (2006.01)

(52) U.S. Cl. ................ 528/18; 528/25; 528/27; 525/476; 525/479

(58) Field of Classification Search ................ 528/18, 528/25, 27; 525/476, 479
See application file for complete search history.

(56) References Cited

U.S. PATENT DOCUMENTS 5,424,383 A * 6/1995 Kimura et al. ............... 528/12

FOREIGN PATENT DOCUMENTS

| EP | 0 918 062 A1 | 5/1999 | |
|----|---|---|---|
| EP | 1 146 084 A2 | 10/2001 | |
| JP | 52-73998 | 6/1977 | |
| JP | 7-165891 A | 6/1995 | |
| JP | 9-100408 A | 4/1997 | |
| JP | 10-87957 A | 4/1998 | |
| JP | 2001-164237 | * | 6/2001 |
| JP | 2002-121407 A | 4/2002 | |
| JP | 2002-194204 A | 7/2002 | |
| JP | 2002-309077 A | 10/2002 | |
| JP | 2004-315702 A | 11/2004 | |
| WO | 03-011978 | * | 2/2003 |

OTHER PUBLICATIONS

Machine generated translation of 2001-164237, Jun. 2001.*
Supplemental European Search Report dated Jan. 26, 2007, issued in corresponding European Application No. 04 82 0528.0.
International Search Report of PCT/JP2004/018350, Date of Mailing Mar. 15, 2005.
Notification of Transmittal of Translation of the International Preliminary Report on Patentability (Form PCT/IB/338) of International Application No. PCT/JP2004/018350 mailed Aug. 3, 2006 with Forms PCT/IB/373 and PCT/ISA/237.

* cited by examiner

*Primary Examiner*—Randy Gulakowski
*Assistant Examiner*—Robert Loewe
(74) *Attorney, Agent, or Firm*—Westerman, Hattori, Daniels & Adrian, LLP

(57) ABSTRACT

The invention aims to improve surface tackiness of a curable composition comprising a reactive silicon group-containing polyoxypropylene polymer without decreasing coating workability, strength, adhesion and appearance. As one embodiment of a means for resolution, a curable composition comprising (A) 100 parts by weight of a reactive silicon group-containing polyoxypropylene polymer, (B) from 0.1 to 20 parts by weight of a silane coupling agent, (C) from 0.1 to 80 parts by weight of an epoxy group-containing compound, (D) from 0.1 to 60 parts by weight of a tertiary amine, and (E) from 0.1 to 30 parts by weight of a primary or secondary amine having a melting point of 20° C. or more is mentioned.

9 Claims, No Drawings

CURABLE COMPOSITION

RELATED APPLICATION

This application is a nationalization of PCT application PCT/JP2004/018350 filed on Dec. 9, 2004, claiming priority based on Japanese Patent application No. 2003-421662 (Dec. 18, 2003), the contents of which are incorporated herein by reference in their entirety.

TECHNICAL FIELD

The present invention relates to a curable composition useful for sealing materials, coating materials, adhesives, filling materials, surface treating materials for concrete or the like, putty materials, damping materials, acoustic insulating materials in architecture, civil engineering industrial usage and the like.

BACKGROUND ART

A room temperature-curable composition comprising a polyoxyalkylene polymer having a silicon-containing group (hereinafter referred to also as a "reactive silicon group") having a hydroxyl group or a hydrolyzable group bound to a silicon atom and capable of crosslinking by forming a siloxane bond has widely been used in sealing materials, coating materials, adhesives, filling materials, surface treating materials for concrete or the like, putty materials, damping materials, acoustic insulating materials and the like for use in architecture, civil engineering, industrial usage and the like in which an epoxy resin or a polyurethane resin was used in the past (refer to, for example, Patent Document 1).

However, a curable composition comprising a reactive silicon group-containing polyoxyalkylene polymer has been problematic in that since the surface after curing still remains tacky for a long period of time, dust and oose adhere after coating to make the surface dirty.

Regarding the surface tackiness of the composition comprising such a reactive silicon group-containing polyoxyalkylene polymer, a method of improvement by addition of an amine, an amide, an alcohol or a fatty acid ester having a melting point of from 10° C. to 200° C. has been proposed (Patent Document 2). However, this method has been problematic in that with these substances, an effect is insufficient, strength is decreased, adhesion to adherend is impaired, and so forth.

Moreover, the foregoing improving agents have posed problems that when an amount of the improvers is small, it takes much time for tackiness to disappear, and that when the amount thereof is increased, the time for disappearance of tackiness is shortened but a large amount of a white powder (carbonates) is separated out on a surface of a cured product to impair appearance.

Patent Document 1: Japanese Patent No. 1396791

Patent Document 2: Japanese Unexamined Patent Application Publication No. 9-100408

DISCLOSURE OF THE INVENTION

Problems that the Invention is to Solve

The problem that the invention is to solve is to improve surface tackiness after coating without decreasing coating workability, strength, adhesion and appearance of a curable composition comprising a reactive silicon group-containing polyoxypropylene polymer.

Means for Solving the Problem

The present inventors have assiduously conducted investigations to solve the problem, and have consequently found that the problem can be improved by using a curable composition comprising the following components, namely a reactive silicon group-containing polyoxypropylene polymer, a silane coupling agent, an epoxy group-containing compound, a tertiary amine, a primary or secondary amine having a melting point of 20° C. or more and, as required, water. This finding has led to the completion of the invention.

That is, the invention relates to a curable composition comprising (A) 100 parts by weight of a reactive silicon group-containing polyoxypropylene polymer, (B) from 0.1 to 20 parts by weight of a silane coupling agent, (C) from 0.1 to 80 parts by weight of an epoxy group-containing compound, (D) from 0.1 to 60 parts by weight of a tertiary amine, and (E) from 0.1 to 30 parts by weight of a primary or secondary amine having a melting point of 20° C. or more.

Further, it relates to a two-component curable composition comprising agent A comprising (A) x parts by weight of a reactive silicon group-containing polyoxypropylene polymer, (B) from 0.1 to 20 parts by weight of a silane coupling agent, (D) from 0.1 to 60 parts by weight of a tertiary amine, and (E) from 0.1 to 30 parts by weight of a primary or secondary amine having a melting point of 20° C. or more (provided 0<x≦100), and agent B comprising (A) 100-x parts by weight of the reactive silicon group-containing polyoxypropylene polymer, (C) from 0.1 to 80 parts by weight of an epoxy group-containing compound, and (F) from 0.1 to 5 parts by weight of water.

Preferably, the viscosity of the composition is at least 50 Pa·s and at most 200 Pa·s at 23° C., and the structural viscosity index thereof is at least 4.0 and at most 10.

Preferably, the composition further comprises (G) from 50 to 300 parts by weight of an inorganic filler.

A primary amine is preferable as component (E).

In one embodiment, the invention further provides a coating material comprising the foregoing curable composition.

EFFECT OF THE INVENTION

The invention provides a curable composition in which surface tackiness after coating is improved without decreasing coating workability, strength, adhesion and appearance.

BEST MODE FOR CARRYING OUT THE INVENTION

The invention is described in detail below. The reactive silicon group of the reactive silicon group-containing polyoxypropylene polymer as component (A) used in the invention is not particularly limited. A typical example thereof is a group represented by the general formula (1).

$$-Si(R^1{}_{3-a})X_a \qquad (1)$$

($R^1$ represents an alkyl group having from 1 to 20 carbon atoms, an aryl group having from 6 to 20 carbon atoms or an aralkyl group having from 7 to 20 carbon atoms, X represents a hydroxyl group or a hydrolyzable group, and a represents 1, 2 or 3.)

Examples of X include a hydrogen atom, a halogen atom, an alkoxy group, an acyloxy group, a ketoximato group, an amino group, an amide group, an acid amide group, an aminoxy group, a mercapto group, an alkenyloxy group and the like. In view of mild hydrolysis and easy handling, alkoxy groups such as a methoxy group, an ethoxy group, a propoxy group and an isopropoxy group are especially preferable.

One to three hydroxyl groups or hydrolyzable groups can be bound to one silicon atom. When two or more groups are present in the reactive silicone group, they may be the same or different.

Specific examples of $R^1$ in the general formula (1) include alkyl groups such as a methyl group and an ethyl group, cycloalkyl groups such as a cyclohexyl group, aryl groups such as a phenyl group, aralkyl groups such as a benzyl group, and the like. As $R^1$, a methyl group is especially preferable.

A main chain structure of the polyoxypropylene polymer as component (A) used in the invention is a polymer in which a structure represented by —CH(CH$_3$)CH$_2$—O— is a recurring unit. Further, it may be a copolymer with a recurring unit represented by —CH$_2$CH$_2$—O—, —CH(C$_2$H$_5$)CH$_2$—O—, —C(CH$_3$)$_2$CH$_2$—O— or —CH$_2$CH$_2$CH$_2$CH$_2$—O—. The main chain may have a branched structure.

The main chain structure of the polyoxyalkylene polymer as component (A) can be obtained by conducting, for example, ring-opening polymerization of a monoepoxide in the presence of an initiator and a catalyst.

Examples of the initiator include monohydric alcohols, dihydric alcohols, polyhydric alcohols, oligomers having a hydroxyl group, and the like. Examples of the monoepoxide include alkylene oxides such as propylene oxide and ethylene oxide, alkylglycidyl ethers such as butylglycidyl ether, allylglycidyl ethers, arylglycidyl ethers, and the like. As the catalyst, alkaline catalysts such as KOH and NaOH, acidic catalysts such as trifluoroborane-etherate, aluminoporphyrin metal complex catalysts, double metal cyanide complex catalysts such as a zinc cobalt cyanide-glyme complex catalyst, and the like are used. In view of a less side reaction, double metal cyanide complex catalysts are especially preferable. However, other catalysts are also available.

In addition, the main chain structure of the polyoxypropylene polymer may also be obtained by subjecting a hydroxyl group-terminated polyoxyalkylene polymer to chain extension with a difunctional or polyfunctional alkyl halide such as CH$_2$Cl$_2$ or CH$_2$Br$_2$ in the presence of a basic compound such as KOH, NaOH, KOCH$_3$ or NaOCH$_3$. There is also a method in which a hydroxyl group-terminated polyoxyalkylene polymer is subjected to chain extension with a difunctional or trifunctional isocyanate compound.

As a method of introducing a reactive silicon group into the polyoxypropylene polymer, for example, a method in which a polyoxypropylene polymer having an unsaturated group represented by the general formula (2):

(wherein $R^3$ represents a divalent organic group having from 1 to 20 carbon atoms, and $R^4$ represents a hydrogen atom or a hydrocarbon group having 10 or less carbon atoms) in the terminal of a molecule is reacted with a reactive silicon group-containing compound represented by the general formula (3):

(wherein $R^1$, X and a are as defined above) in the presence of a VIII group transition metal catalyst is preferable.

Further, it may be obtained by a reaction of a hydroxyl group-terminated polyoxypropylene polymer and a reactive silicon group-containing isocyanate compound, a reaction of an isocyanate group-terminated polyoxypropylene polymer and a reactive silicon group-containing amine compound, a reaction of an isocyanate group-terminated polyoxypropylene polymer and a reactive silicon group-containing mercaptan compound, and the like.

As a method of producing the polyoxypropylene polymer terminating in the unsaturated group represented by the general formula (2), a known method may be used. For example, a method which comprises reacting a polyoxypropylene polymer terminating in a hydroxyl group with a compound having an unsaturated bond to bind both compounds via an ether linkage, an ester linkage, a urethane linkage, a carbonate linkage or the like is mentioned. For example, when an unsaturated group is introduced via an ether linkage, a method which comprises converting the terminal hydroxy group of the polyoxypropylene polymer to a metaloxy group —OM (M is Na, K or the like) and then reacting the same with an unsaturated group-containing compound represented by the general formula (4):

(wherein $R^3$ and $R^4$ are as defined above, and $X^2$ is a halogen atom) is mentioned.

Specific examples of the unsaturated group-containing compound represented by the general formula (4) include CH$_2$=CH—CH$_2$—Cl, CH$_2$=CH—CH$_2$—Br, CH$_2$=CH—C$_2$H$_4$—Cl, CH$_2$=C(CH$_3$)—CH$_2$—Cl and the like. In view of reactivity, CH$_2$=CH—CH$_2$—Cl and CH$_2$=C(CH$_3$)—CH$_2$—Cl are especially preferable.

The method of introducing the unsaturated group includes not only the foregoing method but also a method using an isocyanate compound, a carboxylic acid or an epoxy compound having CH$_2$=CH—CH$_2$—, CH$_2$=C(CH$_3$)—CH$_2$— or the like.

Examples of the VIII group transition metal catalyst include H$_2$PtCl$_6$.6H$_2$O, a platinum-vinylsiloxane complex, a platinum-olefin complex, Pt metal, RhCl(PPh$_3$)$_3$, RhCl$_3$, Rh/Al$_2$O$_3$, RuCl$_3$, IrCl$_3$, FeCl$_3$, PdCl$_2$.2H$_2$O, NiCl$_2$ and the like. In view of reactivity of hydrosilylation, H$_2$PtCl$_6$.H$_2$O, a platinum-vinylsiloxane complex or a platinum-olefin complex is especially preferable.

Such a method is described in, for example, gazettes of Japanese Patent Nos. 1396791, 1727750, 2135751, 2995568 and the like.

The molecular weight of the polyoxypropylene polymer is not particularly limited. It is preferable that the number average molecular weight in terms of polystyrene by GPC is from 500 to 100,000. In view of easy handling or the like, it is more preferably from 1,000 to 70,000.

As the silane coupling agent used as component (B) of the invention, known coupling agents can widely be used. Examples thereof include amino group-containing silanes such as γ-aminopropyltrimethoxysilane, γ-aminopropylmethyldimethoxysilane, γ-(2-aminoethyl)aminopropyltrimethoxysilane, γ-(2-aminoethyl)aminopropylmethyldimethoxysilane, γ-(2-aminoethyl)aminopropyltriethoxysilane, γ-ureidopropyltriethoxysilane, N-β-(N-vinylbenzylaminoethyl)-γ-aminopropyltrimethoxysilane and γ-anilinopropyltrimethoxysilane; mercapto group-containing silanes such as γ-mercaptopropyltrimethoxysilane, γ-mercaptopropyltriethoxysilane, γ-mercaptopropylmethyldimethoxysilane and γ-mercaptopropylmethyldiethoxysilane; epoxy group-containing silanes such as γ-glycidoxypropyltrimethoxysilane, γ-glycidoxypropylmethyldimethoxysilane, γ-glycidoxypropyltriethoxysilane and β-(3,4-epoxycyclohexyl)ethyltrimethoxysilane; carboxysilanes such as β-carboxyethylphenylbis(2-methoxyethoxy)silane and N-β-(N-carboxylmethylaminoethyl)-γ-aminopropyltrimethoxysilane; ketiminosilanes obtained by dehydrative condensation of amino group-containing silanes and ketones; reaction products of amino group-containing silanes and epoxy group-containing silanes; reaction products of mercapto group-containing silanes and epoxy group-containing silanes; reaction products of amino group-containing silanes and epoxy resins; reaction products of mercapto group-containing silanes and epoxy resins; ethyl silicates such as tetraethoxysilane, tetraethoxysilane tetramer and tetraethoxysilane hexamer; vinyl silanes such as vinyltrimethoxysilane, vinyltriethoxysilane and vinyltriacetoxysilane; methacryloxysilanes such as 3-methacryloxypropyltrimethoxysilane and 3-methacryloxypropyltriethoxysilane. These coupling agents may be used either singly or in combination of two or more species. The amount thereof is usually from 0.1 to 20 parts by weight, preferably from 0.2 to 10 parts by weight per 100 parts by weight of component (A). When the amount is less than 0.1 part by weight, adhesion is decreased or storage stability is decreased. When it exceeds 20 parts by weight, inhibition of curing occurs. Thus, these cases are undesirable.

As the epoxy group-containing compound used as component (C) of the invention, known compounds can widely be used. Examples thereof include epoxy resins such as a bisphenol A-type epoxy resin, a bisphenol F-type epoxy resin, a bisphenol AD-type epoxy resin, a bisphenol S-type epoxy resin, epoxy resins obtained by hydrogenating these resins, a glycidyl ester-type epoxy resin, a glycidylamine-type epoxy resin, an alicyclic epoxy resin, a novolak-type epoxy resin, a urethane-modified epoxy resin having a urethane linkage, a fluorinated epoxy resin, a rubber-modified epoxy resin containing polybutadiene or NBS, and a fire-retardant epoxy resin, for example, tetrabromobisphenol A glycidyl ether; and epoxy group-containing silanes such as γ-glycidoxypropyltrimethoxysilane, γ-glycidoxypropylmethyldimethoxysilane, γ-glycidoxypropyltriethoxysilane and β-(3,4-epoxycyclohexyl)ethyltrimethoxysilane. These epoxy group-containing compounds may be used either singly or in combination of two or more species. Of these epoxy group-containing compounds, epoxy resins are preferable in view of workability, curability, adhesion, adhesion strength and the like. A bisphenol A-type epoxy resin is more preferable in view of water resistance, durability and the like. It is advisable that the epoxy group-containing compound is used in an amount of, usually from 0.1 to 80 parts by weight, preferably from 1 to 60 parts by weight per 100 parts by weight of component (A). When the amount is less than 0.1 part by weight, adhesion or adhesion strength is insufficient. When it exceeds 80 parts by weight, elongation of a cured product becomes unsatisfactory. Thus, these cases are undesirable.

As the tertiary amine used as component (D) of the invention, known compounds can widely be used. Examples thereof include aliphatic amines such as N,N,N',N'-tetramethylethylenediamine, N,N,N',N'-tetramethyl-1,3-diaminopropane, N,N,N',N'-tetramethyl-1,4-diaminobutane and N,N,N',N'-tetramethyl-1,6-diaminohexane; alicyclic amines such as N,N'-dimethylpiperazine, 1,8-diazabicyclo[5,4,0]undecene-7(DBU), 1,5-diazabicyclo[4,3,0]nonene-5,6-dibutylamino-1,8-diazabicyclo[5,4,0]undecene-7,N,N-dimethylcyclohexylamine, 1,2-bis(dimethylamino)cyclohexane, 1,4-bis(dimethylamino)cyclohexane, N,N,N',N'-tetramethylisophorondiamine, N,N,N',N'-tetramethylnorbornanediamine, bis(4-dimethylaminocyclohexyl)methane and bis(4-dimethylamino-3-methylcyclohexyl)methane; aromatic amines such as N,N,N',N'-tetramethyl-1,4-phenylenediamine, N,N-dimethylbenzylamine and α-methylbenzyldimethylamine; aralphatic amines such as 2-(dimethylaminomethyl)phenol and 2,4,6-tris(dimethylaminomethyl)phenol; amines having an ether linkage, such as N-methylmorpholine; and the like. These tertiary amines may be used either singly or in combination of two or more species. Of these tertiary amines, 2,4,6-tris(dimethylaminomethyl)phenol is preferable in view of a balance of properties such as curability and adhesion. The amount thereof is usually from 0.1 to 60 parts by weight, preferably from 1 to 40 parts by weight per 100 parts by weight of component (A). When the amount is less than 0.1 part by weight, curing of the epoxy resin is unsatisfactory, and adhesion strength and adhesion are decreased. When it exceeds 60 parts by weight, bleeding into the interface or the like takes place to decrease adhesion. Thus, both cases are undesirable.

When the tertiary amine containing the reactive silicon group is used as component (D), there is likelihood that dynamic properties of the resulting cured product are decreased. Accordingly, a reactive silicon group-free tertiary amine is preferable as component (D).

The primary or secondary amine having the melting point of 20° C. or more, which is used as component (E) of the invention, includes the following compounds, which are not critical though. Further, the upper limit of the melting point of component (E) need not be defined in particular. However, the general numerical range is 200° C. or less. Examples of the primary amine can include aliphatic monoamines such as laurylamine, tetradecylamine, cetylamine, stearylamine and nonadecylamine; aliphatic diamines such as 1,4-diaminobutane, 1,5-diaminopentane, 1,6-diaminohexane, 1,7-diaminoheptane, 1,8-diaminooctane, 1,9-diaminononane, 1,10-diaminodecane, 1,11-diaminoundecane, 1,12-diaminododecane, 1,14-diaminotetradecane, 1,16-diaminohexadecane, 1,18-diaminooctadecane, 1,20-diaminoeicosane and 1,2-diaminocyclohexane; and aromatic diamines such as phenylenediamine, 2,2'-diaminodiphenylamine, 4,4'-diaminodiphenylamine, 2,2'-diaminodiphenylmethane and 4,4'-diaminodiphenylmethane. Examples of the secondary amine include aliphatic monoamines such as dilaurylamine, dicetylamine and distearylamine. The primary amine is preferable to the secondary amine because the surface tackiness disappears for a shorter period of time. Regarding the primary amine, the use of aliphatic monoamines such as cetylamine and stearylamine is preferable in view of the effect of tackiness disappearance and costs. The amount thereof is usually from 0.1 to 30 parts by weight, preferably from 1 to 20 parts by weight per 100 parts by weight of component (A). When the amount is less than 0.1 parts by weight, it takes much time for tackiness to disappear. When it exceeds 30 parts by weight, a white powder is separated out in a large amount, or an increase in viscosity is observed during storage. Thus, these cases are undesirable. Even when the amount is in the range of from 0.1 to 30 parts by weight, a white powder is separated out on the surface. In the invention, the very problem is solved by the combined use of the epoxy group-containing compound as component (C), and a balance of tackiness disappearance for a short period of time and designing appearance can be realized.

When a primary or secondary amine containing a reactive silicon group and having a melting point of 20° C. or more is used as component (E), there is a likelihood of decreasing dynamic properties of the resulting cured product. Accordingly, a reactive silicon group-free primary or secondary amine having a melting point of 20° C. or more is preferable as component (E).

Water as component (F) of the invention is required in hydrolysis and a condensation reaction during the curing of component (A), and general city water, industrial water, purified water and the like are used. When water is used in winter, salts, alcohols or the like having a function of decreasing a freezing point may be added. The amount of water is usually from 0.1 to 5 parts by weight, preferably from 0.2 to 4 parts by weight per 100 parts by weight of component (A). When the amount is less than 0.1 part by weight, inner curability is insufficient. When it exceeds 5 parts by weight, a decrease in adhesion or the like occurs. Thus, these cases are undesirable.

Specific examples of the inorganic filler as component (G) of the invention include ground calcium carbonate, light calcium carbonate, colloidal calcium carbonate, magnesium carbonate, clay, kaolin, talc, mica, silica (fumed silica, precipitated silica, crystalline silica, molten silica, dolomite, silicic anhydride, silicic hydride or the like), titanium oxide, diatomaceous earth and the like. These inorganic fillers may be used either singly or in combination of two or more species. In view of workability, costs, a balance of properties and the like, it is preferable to use ground calcium carbonate or colloidal calcium carbonate. The amount thereof is usually from 50 to 300 parts by weight, preferably from 70 to 200 parts by weight per 100 parts by weight of component (A). When the amount is less than 50 parts by weight, viscosity of the composition is decreased, and stringing resistance becomes poor. Thus, it is undesirable. When it exceeds 300 parts by weight, viscosity of the composition is increased, and workability is decreased. Thus, it is undesirable.

When the curable composition of the invention is a two-component type, component (G) may be incorporated into both of agents A and B or one of agents A and B. When component (G) is incorporated into both of agents A and B, components (G) different in recipe may be incorporated. In both cases, it is advisable to use component (G) in an amount of, usually from 50 to 300 parts by weight, preferably from 70 to 200 parts by weight based on a total amount of component (A) (sum of an amount of component (A) in agent A and an amount of component (A) in agent B).

It is possible to add, as required, a condensation catalyst, a plasticizer, a thixotropic agent, a reactive diluting agent, a stabilizer, a coloring agent and the like to the curable composition of the invention.

As the condensation catalyst, known catalysts used for condensation of a reactive silicon group-containing polymer can widely be used. Specific examples thereof include silanol condensation catalysts, for example, organotin compounds such as dibutyltin dilaurate, bis(dibutyltin laurate) oxide, dibutyltin maleate, dibutyltin diacetate, tin 2-ethylhexanoate, tin naphthenate, tin versatate, a reaction product of dibutyltin oxide and a phthalate, a reaction product of dibutyltin oxide and a maleate, a reaction product of dibutyltin oxide and ethyl silicate and dibutyltin bisacetylacetonate; titanic acid esters such as tetrabutyl titanate and tetraisopropyl titanate; organoaluminum compounds such as aluminum trisacetylacetonate, aluminum trisethylacetoacetate and diisopropoxyaluminumethyl acetoacetate; chelate compounds such as zirconium tetraacetylacetonate and titanium tetraacetylacetonate; bismuth tris(2-ethylhexanoate); zinc octylate; amine compounds such as octylamine, laurylamine and 2,4,6-tris(dimethylaminomethyl)phenol or carboxylic acid salts thereof; acidic phosphoric acid esters; and reaction products of acidic phosphoric acid esters, as well as known silanol condensation catalysts such as other acidic catalysts and basic catalysts. These catalysts may be used either singly or in combination of two or more species. Of these condensation catalysts, organotin compounds are preferable in view of curability, storage stability and a balance of properties. Tetravalent tin catalysts are especially preferable in view of a curing rate and storage stability. The amount thereof is usually from 0.1 to 10 parts by weight, preferably from 0.2 to 6 parts by weight per 100 parts by weight of component (A). When the amount is less than 0.1 part by weight, curability is insufficient. When it exceeds 10 parts by weight, a decrease in adhesion or the like occurs. Thus, these cases are undesirable.

When the curable composition of the invention is a two-component type and contains component (A) in agent B, incorporation of the condensation catalyst into agent B causes a curing reaction with agent B only. Thus, it is advisable to incorporate the condensation catalyst into agent A.

Specific examples of the plasticizer include phthalic acid esters such as dibutyl phthalate, di(2-ethylhexyl) phthalate, diisononyl phthalate, diisodecyl phthalate and butylbenzyl phthalate; non-aromatic dibasic esters such as dioctyl adipate, dioctyl sebacate, dibutyl sebacate and isodecyl succinate; aliphatic esters such as butyl oleate and methyl acetylricinolate; polyalkylene glycol esters such as diethylene glycol dibenzoate, triethylene glycol dibenzoate and pentaerythritol ester; phosphoric acid esters such as tricresyl phosphate and tributyl phosphate; trimellitic acid esters; polybutadiene, polybutene, polyisobutylene, butadiene-acrylonitrile, polychloroprene; chlorinated paraffins; hydrocarbon oils such as alkyldiphenyls and partially hydrogenated terphenyls; process oils; polyether polyols such as polyethylene glycol, polypropylene glycol and polytetramethylene glycol, polyethers such as derivatives of polyether polyols obtained by converting a hydroxyl group thereof to an ester group, an ether group or the like; epoxy-type plasticizers such as epoxidized soybean oil and benzyl epoxystearate; polyester plasticizers obtained from dibasic acids such as sebacic acid, adipic acid, azelaic acid and phthalic acid and dihydric alcohols such as ethylene glycol, diethylene glycol, triethylene glycol, propylene glycol and dipropylene glycol; vinyl polymers resulting from polymerization of vinyl monomers including acrylic plasticizers by various methods; and the like. These plasticizers may be used either singly or in combination of two or more species. When the plasticizer is used, its amount is not particularly limited. It is from 5 to 100 parts by weight, preferably from 10 to 80 parts by weight per 100 parts by weight of component (A). When the amount is less than 5 parts by weight, the effect as the plasticizer is not exhibited. When it exceeds 100 parts by weight, mechanical strength of the cured product is insufficient. Thus, these cases are undesirable.

Examples of the thixotropic agent include polyamide waxes, hydrogenated castor oil derivatives; metallic soaps such as calcium stearate, aluminum stearate and barium stearate; and the like. These thixotropic agents may be used either singly or in combination of two or more species.

The curable composition of the invention may be prepared in the form of a one-component type in which all components are previously sealed and stored and the composition is cured with moisture in air after coating, or in the form of a two-component type in which water required for inner curing of component (A) is previously incorporated in agent B and agent B is mixed with agent A containing component (A) just before use. In the two-component type, the inner curability of the composition is greatly improved. Accordingly, when the composition is used in, for example, plant line, the cured product can be moved to the next step in a short period of time.

The curable composition of the invention may be coated on an adherend in the form of beads or by spraying. As required, it may be cast or brushed. Further, after coating, it may be cured by heating or by being allowed to stand at room temperature.

The viscosity or the structural viscosity index of the curable composition of the invention can arbitrarily be adjusted according to a coating mode such as bead coating, spray coating, casting or brushing. Especially when the composition prepared in the form of a two-component type is coated with a static mixer or the like, the viscosity is preferably at least 50 Pa·s at 23° C. in view of easy mixing of agents A and B and at most 200 Pa·s at 23° C. in view of easy mixing of agents A and B, and at most 200 Pa·s in view of coating workability. The structural viscosity index is preferably at least 4.0 in view of less sagging of the composition and at most 10 in view of coating workability. In this case, the viscosity refers to viscosity measured at 20 rpm with a No. 7 rotor in a BH-type viscometer. The structural viscosity index refers to a value obtained by dividing a viscosity value measured at 2 rpm by a viscosity value measured at 20 rpm. When the curable composition of the invention is a two-component type, the measured values are those of a mixture just after mixing agents A and B.

The use of the curable composition of the invention is not particularly limited. It can widely be used for architecture, civil engineering, industrial usage, electronic materials, medical materials and the like. Regarding the use for architecture, the curable composition is used for sealing materials, coating materials, primers and the like for joint of exterior members such as metal panels and sizing boards; sealing materials, adhesives, filling materials, damping materials, acoustic insulating materials, electromagnetic wave-blocking conductive materials, putty materials and the like; adhesives for bonding tiles or stone materials on outer wall materials and undercoat materials; adhesives and tackifiers for bonding wood flooring materials, polymeric material-type floor sheets and floor tiles on floors, mending materials for crack repair of exterior and interior materials; and the like. Regarding the use for civil engineering, the composition is used for sealing materials, coating materials, primers, paints, filling materials, putty materials, templating materials, spraying materials and the like for joint of roads, bridges, tunnels, breakwaters and various concrete products; and the like. Regarding the use for industrial usage, the composition is used for sealing materials, coating materials, cushioning materials, damping materials, acoustic insulating materials, spraying materials and the like of automobile bodies; adhesives, tackifiers, coating materials, foam materials and the like for automobile interior materials; sealing materials, adhesives and the like of automobile parts; and sealing materials, adhesives, coating materials and the like for various steel plate joints of trucks, buses and the like. Further, the composition can be used for adhesives, sealing materials, solar battery back sealing materials and the like for parts of electric and electronic articles, electrical insulating materials such as insulating coating materials for wires and cables, heat conduction materials, hot melt materials, potting agents for electric and electronic articles, medical rubber materials, medical tackifiers, medical equipment sealing materials, and liquid sealing agents used in food packages, films, gaskets, molding materials, electric parts, mechanical parts and the like.

EXAMPLES

The invention is illustrated more specifically below by referring to Examples. However, the invention is not limited thereto.

Synthesis Example 1

Propylene oxide was polymerized using polypropylene triol having an average molecular weight of approximately 3,000 as an initiator and a zinc hexacyanocobaltate-glyme complex catalyst to obtain polyoxypropylene triol having an average molecular weight of 12,000. Subsequently, 1.2 equivalents, based on the hydroxyl group of hydroxy group-terminated polyoxypropylene, of an NaOMe methanol solution was added thereto. Methanol was distilled off, and 3-chloro-1-propene was further added to convert the terminal hydroxyl group to an allyl group. Then, 10 g of hexane was added to 500 g of the resulting polymer to conduct azeotropic dehydration at 90° C. After hexane was distilled off under reduced pressure, the reaction vessel was purged with nitrogen. 30 µl of a platinum divinyldisiloxane complex (3 wt. % xylylene solution calculated as platinum) was added thereto, and 9.25 g of dimethoxymethylsilane (DMS) was slowly added dropwise while being stirred. After the mixed solution was reacted at 90° C. for 2 hours, unreacted DMS was distilled off under reduced pressure to obtain a reactive silicon group-containing polyoxypropylene polymer. By $^1$H-NMR analysis of the resulting polymer, it was confirmed that the introduction rate of the reactive silicon group into the terminal was 83% (polymer A).

Examples 1 to 8 and Comparative Examples 1 to 7

A composition was produced according to a recipe shown in Table 1, and coating workability, surface tackiness, dumbbell tensile properties and adhesion were evaluated.

(1) Coating workability: Viscosities at 2 rpm and 20 rpm were measured using a BH-type viscometer (No. 7 rotor, temperature 23° C.). Structural viscosity index was calculated by dividing a viscosity value measured at 2 rpm by a viscosity value measured at 20 rpm.

In the evaluation, a case which satisfied the viscosity at 20 rpm of 200 Pa·s or less and the structural viscosity index of 4.0 or more was indicated by good, and a case which did not satisfy the same was indicated by poor.

(2) Surface Tackiness:

The composition was protruded, and the surface of the composition was held with a finger over the course of time. A time that lapsed until tackiness disappeared was measured (temperature 23° C., relative humidity 50%).

In the evaluation, a case in which tackiness disappeared within 30 minutes was indicated by good, and a case in which tackiness did not disappear within 30 minutes was indicated by poor.

(3) Appearance: The composition was protruded, then leveled the surface, and allowed to stand still overnight. Thereafter, a separated-out state of a white powder was observed (temperature 23° C., relative humidity 50%).

The surface of the cured product was touched with a finger. A case in which a white powder was not adhered to the finger was indicated by good, and a case in which a white powder was adhered thereto was indicated by poor.

(4) Dumbbell tensile properties: A composition sheet having a thickness of approximately 2 mm was produced, and aged at 23° C. for 3 days and at 50° C. for 4 days. Then, No. 3 dumbbell tensile specimens in accordance with JIS K 6251 were punched out, and strength (TB) and elongation (EB) were measured by a tensile test. Pulling speed is 200 mm/min.

(5) Adhesion: A surface of a mortar (70×70×20 mm) dipped overnight in water was wiped out, and the composition was coated in the form of beads, and aged at 23° C. for 7 days. At this time, the water level was adjusted to approximately 10 mm, and the system was closed to keep the surface wet. After the aging, the cured product was peeled, and the adhesion state was observed.

A case in which the cured product remained on the substrate side was indicated by good, and a case in which the cured product did not remain thereon was indicated by poor.

The recipe of the composition and the evaluation results are shown in Table 1.

TABLE 1

| | | | | Example | | | | | | | |
| --- | --- | --- | --- | --- | --- | --- | --- | --- | --- | --- | --- |
| | | | | 1 | 2 | 3 | 4 | 5 | 6 | 7 | 8 |
| Recipe | Agent (A) | Component (A) | Polymer A | 100 | 100 | 100 | 100 | 100 | 100 | 56 | 100 |
| | | Component (B) | A-1120*a | 2.8 | 2.8 | 2.8 | 2.8 | 2.8 | 2.8 | 2.8 | 2.8 |
| | | Component (D) | TAP*b | 1.7 | 1.7 | 1.7 | 1.7 | 1.7 | 1.7 | 2.8 | 1.7 |
| | | Component (E) | Hexamethylenediamine*1 | 1.7 | 2.8 | | | | | | 1.7 |
| | | | 1,12-Diaminododecane*2 | | | 2.8 | | | | | |
| | | | Hexadecylamine*3 | | | | 2.8 | 5.6 | 4.4 | 2.8 | |
| | | Component (E') | Triethylenetetramine*4 (m.p. 12° C.) | | | | | | | | |
| | | Component (G) | PLS505*c | 56 | 56 | 56 | 56 | 56 | 56 | 28 | 56 |
| | | | M-300*d | 11 | 11 | 11 | 11 | 11 | 11 | 39 | 11 |
| | | Condensation catalyst | No. 918*e | 2.8 | 2.8 | 2.8 | 2.8 | 2.8 | 2.8 | 2.8 | 2.8 |
| | Agent (B) | Component (A) | Polymer A | | | | | | | 44 | |
| | | Component (C) | Epikote828*f | 11 | 11 | 11 | 11 | 11 | 17 | 17 | 17 |
| | | Component (G) | Calseez P*g | 22 | 22 | 22 | 22 | 22 | | | |
| | | | M-300*d | 5.6 | 5.6 | 5.6 | 5.6 | 5.6 | 11 | | 22 |
| | | | PLS505*c | | | | | | 28 | | |
| | | | Calseez P-55*h | | | | | | | 64 | 28 |
| | | Component (F) | Water | 1.1 | 1.1 | 1.1 | 1.1 | 1.1 | 1.1 | 1.1 | 1.1 |
| | | Plasticizer | PPG3000 | 44 | 44 | 44 | 44 | 44 | 28 | 6 | 17 |
| Results | Coating workability | Structural viscosity index | | 439 | 441 | 434 | 411 | 420 | 722 | 682 | 1100 |
| | | | | 102 | 105 | 97.2 | 84 | 87 | 114 | 142 | 230 |
| | | | | 4.3 | 4.2 | 4.5 | 4.9 | 4.8 | 6.3 | 4.8 | 4.8 |
| | | Evaluation | | good | good | good | good | good | good | good | poor |
| | Surface tackiness | Tackiness disappearance time (min) | | 15 | 15 | 16 | 17 | 16 | 18 | 18 | 17 |
| | | Evaluation | | good | good | good | good | good | good | good | good |
| | Appearance | | | good | good | good | good | good | good | good | good |
| | Dumbbell tensile properties | TB (MPa) | | 1.9 | 1.8 | 1.8 | 1.9 | 1.8 | 3.0 | 3.6 | 3.3 |
| | | EB (%) | | 230 | 220 | 200 | 280 | 290 | 190 | 180 | 160 |
| | Adhesion | Wet mortar | | good | good | good | good | good | good | good | good |

| | | | | Comparative Example | | | | | | |
| --- | --- | --- | --- | --- | --- | --- | --- | --- | --- | --- |
| | | | | 1 | 2 | 3 | 4 | 5 | 6 | 7 |
| Recipe | Agent (A) | Component (A) | Polymer A | 100 | 100 | 100 | 100 | 100 | 100 | 56 |
| | | Component (B) | A-1120*a | 2.8 | 2.8 | 2.8 | 2.8 | 2.8 | 2.8 | 2.8 |
| | | Component (D) | TAP*b | 1.7 | 1.7 | 1.7 | | 1.7 | 1.7 | 2.8 |
| | | Component (E) | Hexamethylenediamine*1 | | | | | | | |
| | | | 1,12-Diaminododecane*2 | | | | | | | |
| | | | Hexadecylamine*3 | | | 2.8 | 5.6 | 5.6 | 0.03 | |
| | | Component (E') | Triethylenetetramine*4 (m.p. 12° C.) | | 2.1 | | | | | |
| | | Component (G) | PLS505*c | 56 | 56 | 56 | 56 | 56 | 56 | 28 |
| | | | M-300*d | 11 | 11 | 11 | 11 | 11 | 11 | 39 |
| | | Condensation catalyst | No. 918*e | 2.8 | 2.8 | 2.8 | 2.8 | 2.8 | 2.8 | 2.8 |
| | Agent (B) | Component (A) | Polymer A | | | | | | | 44 |
| | | Component (C) | Epikote828*f | 11 | 11 | | | 11 | 17 | 17 |
| | | Component (G) | Calseez P*g | 22 | 22 | 22 | 22 | 22 | | |
| | | | M-300*d | 5.6 | 5.6 | 5.6 | 5.6 | 5.6 | 11 | |
| | | | PLS505*c | | | | | | 28 | |
| | | | Calseez P-55*h | | | | | | | 64 |
| | | Component (F) | Water | 1.1 | 1.1 | 1.1 | 1.1 | 1.1 | 1.1 | 1.1 |
| | | Plasticizer | PPG3000 | 44 | 44 | 44 | 44 | 44 | 28 | 5.6 |
| Results | Coating workability | Structural viscosity index | | 420 | 472 | 354 | 446 | 468 | 715 | 672 |
| | | | | 97 | 101 | 75.6 | 97.2 | 99 | 107 | 143 |
| | | | | 4.3 | 4.7 | 4.7 | 4.6 | 4.7 | 6.7 | 4.7 |
| | | Evaluation | | good | good | good | good | good | good | good |

TABLE 1-continued

| | | | | | | | | |
|---|---|---|---|---|---|---|---|---|
| Surface tackiness | Tackiness disappearance time (min) | >210 | >210 | 16 | 16 | >210 | >210 | >210 |
| | Evaluation | poor | poor | good | good | poor | poor | poor |
| Appearance | | good | good | poor | poor | good | good | good |
| Dumbbell tensile properties | TB (MPa) | 2.0 | 1.7 | 1.4 | 1.4 | 1.8 | 1.9 | 3.7 |
| | EB (%) | 180 | 190 | 190 | 190 | 190 | 200 | 180 |
| Adhesion | Wet mortar | good | good | poor | poor | good | good | good |

*a: N-2-aminoethyl-3-aminopropyltrimethoxysilane (Nippon Unicar Co.),
*b: 2,4,6-tris(dimethylaminomethyl)phenol (Kayaku-Akuzo K.K.),
*c: colloidal calcium carbonate (Konoshima Kagaku Kogyo K.K.),
*d; ground calcium carbonate (Maruo Calcium K.K.),
*e: organotin compound (Sankyo Organic Synthesis Co.)
*f: bisphenol A-type epoxy resin (Japan Epoxy Resin K.K.),
*g: colloidal calcium carbonate (Konoshima Kagaku Kogyo K.K.),
*h: colloidal calcium carbonate (Konoshima Kagaku Kogyo K.K.)
Melting point *1: 40° C., *2: 69° C., *3: 46° C., *4: 12° C.

With respect to the curable compositions in Examples, coating workability, strength, adhesion and appearance were good, and surface tackiness disappeared for a short period of time. Meanwhile, with respect to the curable compositions in Comparative Examples, the balance of these properties could not be secured.

The invention claimed is:

1. A two-component curable composition comprising agent A comprising
   (A) x parts by weight of a reactive silicon group-containing polyoxypropylene polymer,
   (B) from 0.2 to 10 parts by weight of a silane coupling agent,
   (D) from 1 to 40 parts by weight of a curing agent for an epoxy resin containing a tertiary amine, and
   (E) from 1 to 20 parts by weight of a primary or secondary amine having a melting point of 20° C. or more (provided 0<x≦100), and from 0.2 to 6 parts by weight of a tetravalent organo-tin condensation catalyst, and
agent B comprising
   (A) 100-x parts by weight of the reactive silicon group-containing polyoxypropylene polymer,
   (C) from 1 to 60 parts by weight of an epoxy resin, and
   (F) from 0.1 to 5 parts by weight of water.

2. The curable composition as claimed in claim 1, wherein the viscosity of the composition is at least 50 Pa·s and at most 200 Pa·s at 23° C., and the structural viscosity index thereof is at least 4.0 and at most 10.

3. The curable composition as claimed in claim 1, which further comprises
   (G) from 50 to 300 parts by weight of an inorganic filler.

4. The curable composition as claimed in claim 1, wherein component (E) is a primary amine.

5. A coating material comprising the curable composition as claimed in claim 1.

6. The curable composition as claimed in claim 1, wherein component (D) is an araliphatic amine.

7. The curable composition as claimed in claim 1, wherein component (D) is a 2,4,6-tris(dimethylaminomethylphenol).

8. The curable composition of claim 1, wherein x=100.

9. The two-component curable composition of claim 1, wherein the tetravalent organo-tin condensation catalyst is selected from the group consisting of dibutyltin dilaurate, bis(dibutyltin laurate) oxide, dibutyltin maleate dibutyltin diacetate, a reaction product of dibutyltin oxide and a phthalate, a reaction product of dibutyltin oxide and a maleate, a reaction product of dibutyltin oxide and ethyl silicate and dibutyltin bisacetylacetonate.

* * * * *